US006637763B2

(12) United States Patent
Kuo

(10) Patent No.: US 6,637,763 B2
(45) Date of Patent: Oct. 28, 2003

(54) ENCLOSED MOTORCYCLE

(76) Inventor: Ming C. Kuo, 19350 Christina Ct., Cerritos, CA (US) 90703

( * ) Notice: Subject to any disclaimer, the term of this patent is extended or adjusted under 35 U.S.C. 154(b) by 102 days.

(21) Appl. No.: 10/002,901

(22) Filed: Dec. 5, 2001

(65) Prior Publication Data

US 2003/0102657 A1 Jun. 5, 2003

(51) Int. Cl.[7] .............................................. B62K 13/06
(52) U.S. Cl. ........................................ 280/209; 280/748
(58) Field of Search ............................... 280/209, 748, 280/756, 763.1, 767; 180/89.1; 296/78.1

(56) References Cited

U.S. PATENT DOCUMENTS

| 3,322,224 | A | * | 5/1967 | Muller ........................ 180/291 |
| 3,700,059 | A | | 10/1972 | Sutton | |
| 4,065,144 | A | * | 12/1977 | Winchell .................... 280/771 |
| 4,133,402 | A | | 1/1979 | Soo Hoo | |
| 4,293,052 | A | * | 10/1981 | Daswick et al. ........... 180/219 |
| 5,029,894 | A | | 7/1991 | Willman | |
| 5,181,740 | A | | 1/1993 | Horn | |
| 5,401,055 | A | | 3/1995 | Pham | |
| 5,458,390 | A | * | 10/1995 | Gilbert ...................... 296/78.1 |
| 5,518,259 | A | * | 5/1996 | Hall ........................... 280/43.2 |
| 5,685,388 | A | * | 11/1997 | Bothwell et al. .......... 180/219 |
| 5,904,392 | A | * | 5/1999 | Mainwal .................... 296/78.1 |
| 6,106,054 | A | * | 8/2000 | Wagner ...................... 296/180.5 |

* cited by examiner

Primary Examiner—Eric Culbreth
Assistant Examiner—Faye M. Fleming
(74) Attorney, Agent, or Firm—Gordon K. Anderson

(57) ABSTRACT

An enclosed motorcycle (10) that utilizes a structural frame (14), a pair of tandem wheels (36,38), an engine (40) and a handlebar assembly (46) provides transportation for a single driver. A foot brake pedal assembly (96) is pivotally affixed to the frame for stopping the motorcycle and a bench seat (132) is rigidly attached to the frame for seating the driver. A pair of outrigger landing wheels (140) are attached to the motorcycle frame on a common axle and have automatic control to extend the wheels at a predetermined road speed, for preventing tipping at low speeds and when stopped. An enclosure (16) is disposed over and attached to the frame which includes a pair of entrance doors (172) and a pair of leg doors (170), one on each side of the motorcycle for access to the seat for minimizing the enclosure envelope and providing effortless entry into the motorcycle. A two piece external passenger seat (272) is provided over the engine with a fold down cargo compartment underneath. When the seats are hinged upward the cargo compartment mechanically unfolds providing storage space.

30 Claims, 9 Drawing Sheets

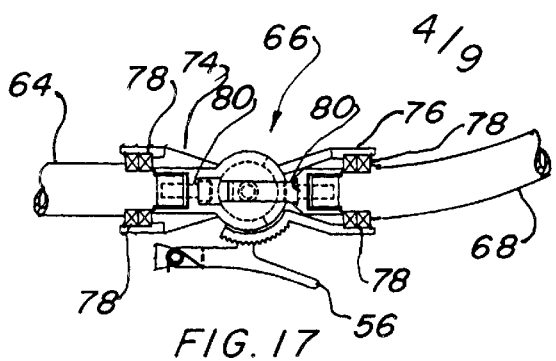
FIG. 17
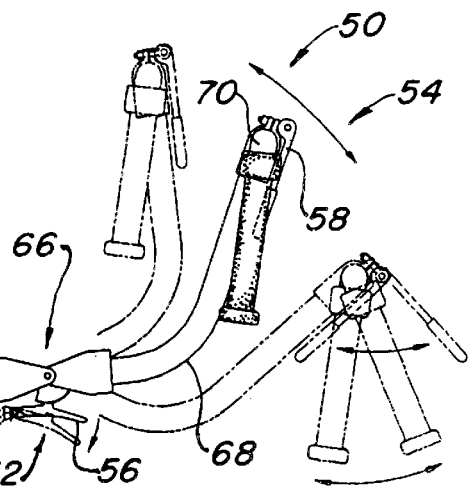
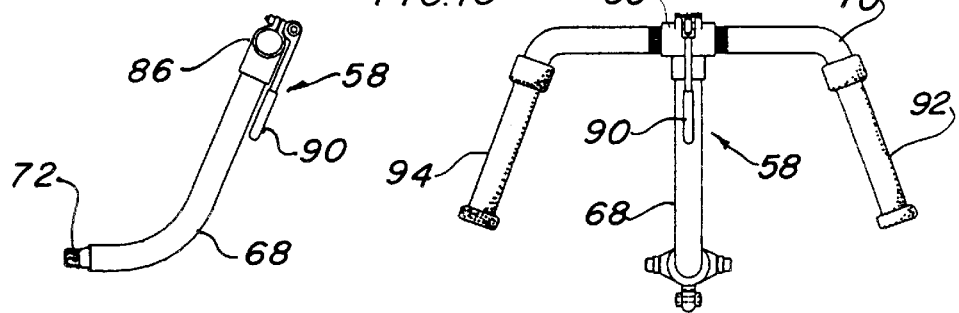
FIG. 18
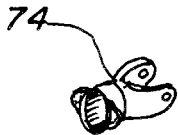
FIG. 19
FIG. 20
FIG. 21
FIG. 22  FIG. 23  FIG. 24  FIG. 25
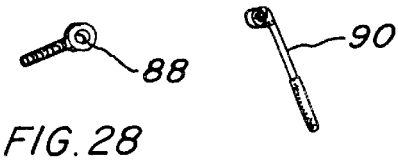
FIG. 26  FIG. 27  FIG. 28  FIG. 29

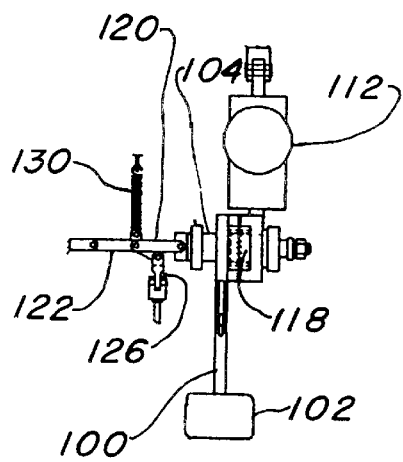
FIG. 30 ENGAGED
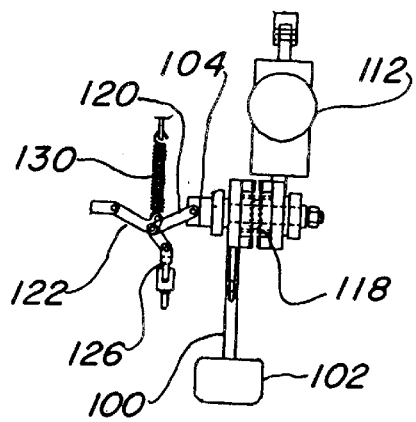
FIG. 31 DISENGAGED
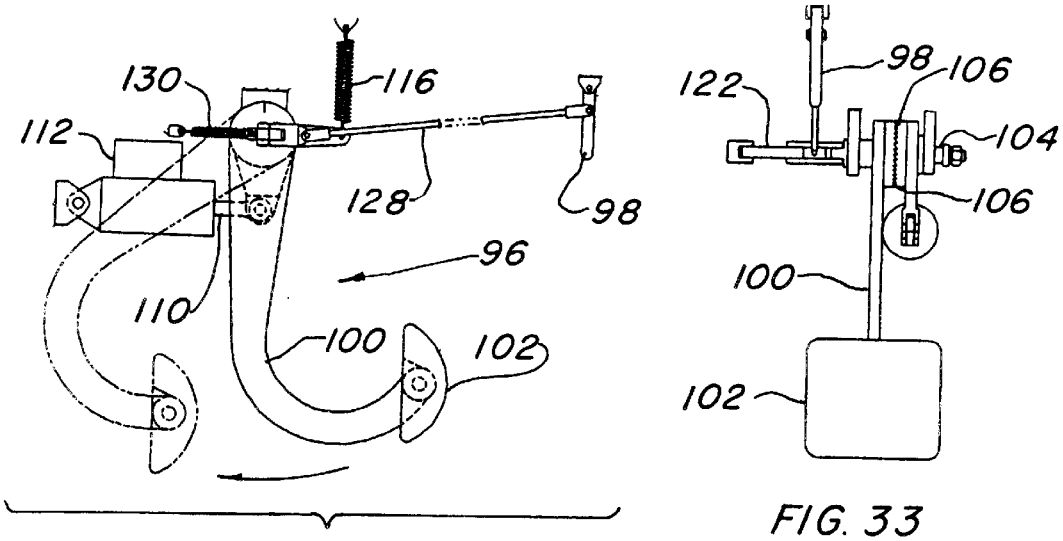
FIG. 32
FIG. 33
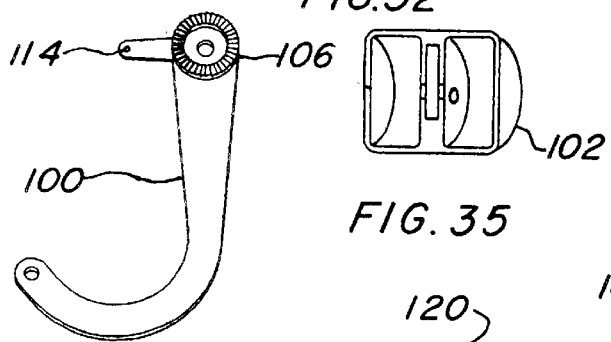
FIG. 34  FIG. 35  FIG. 36  FIG. 37
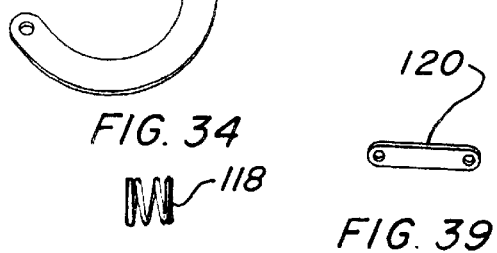
FIG. 38  FIG. 39  FIG. 40
FIG. 41

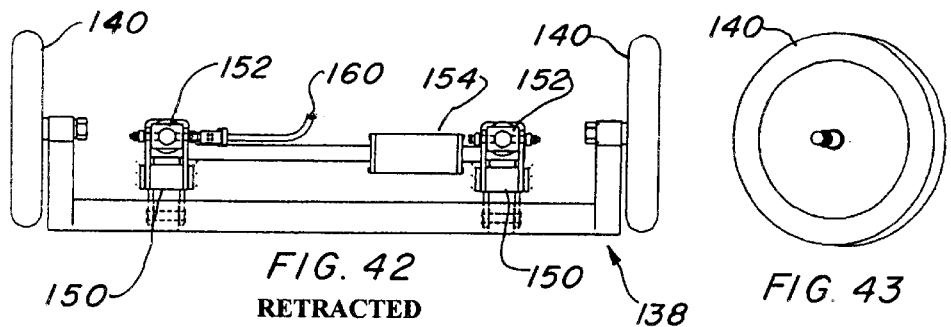
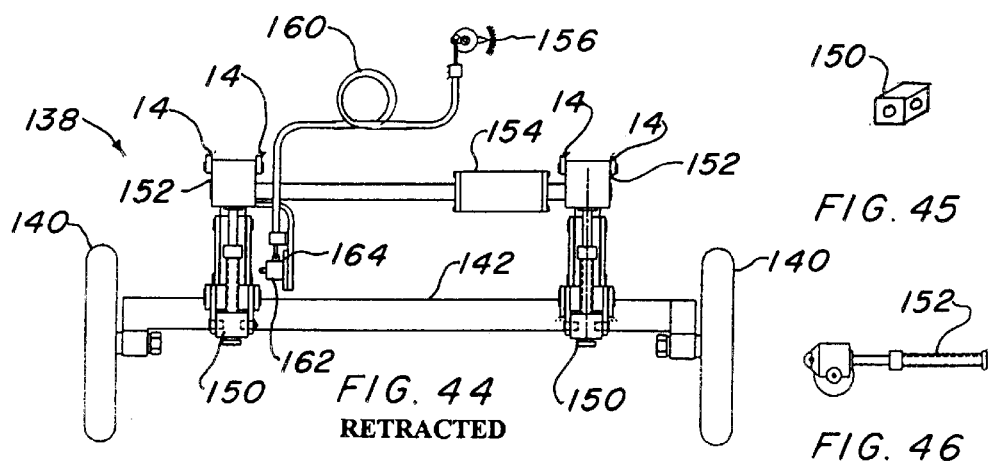
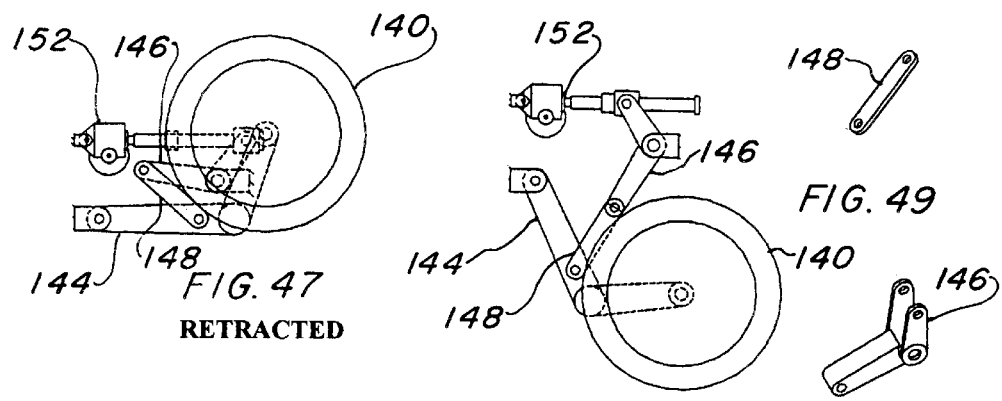
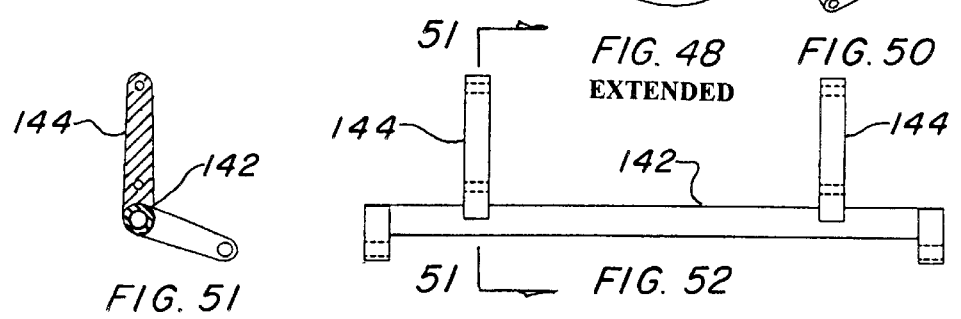

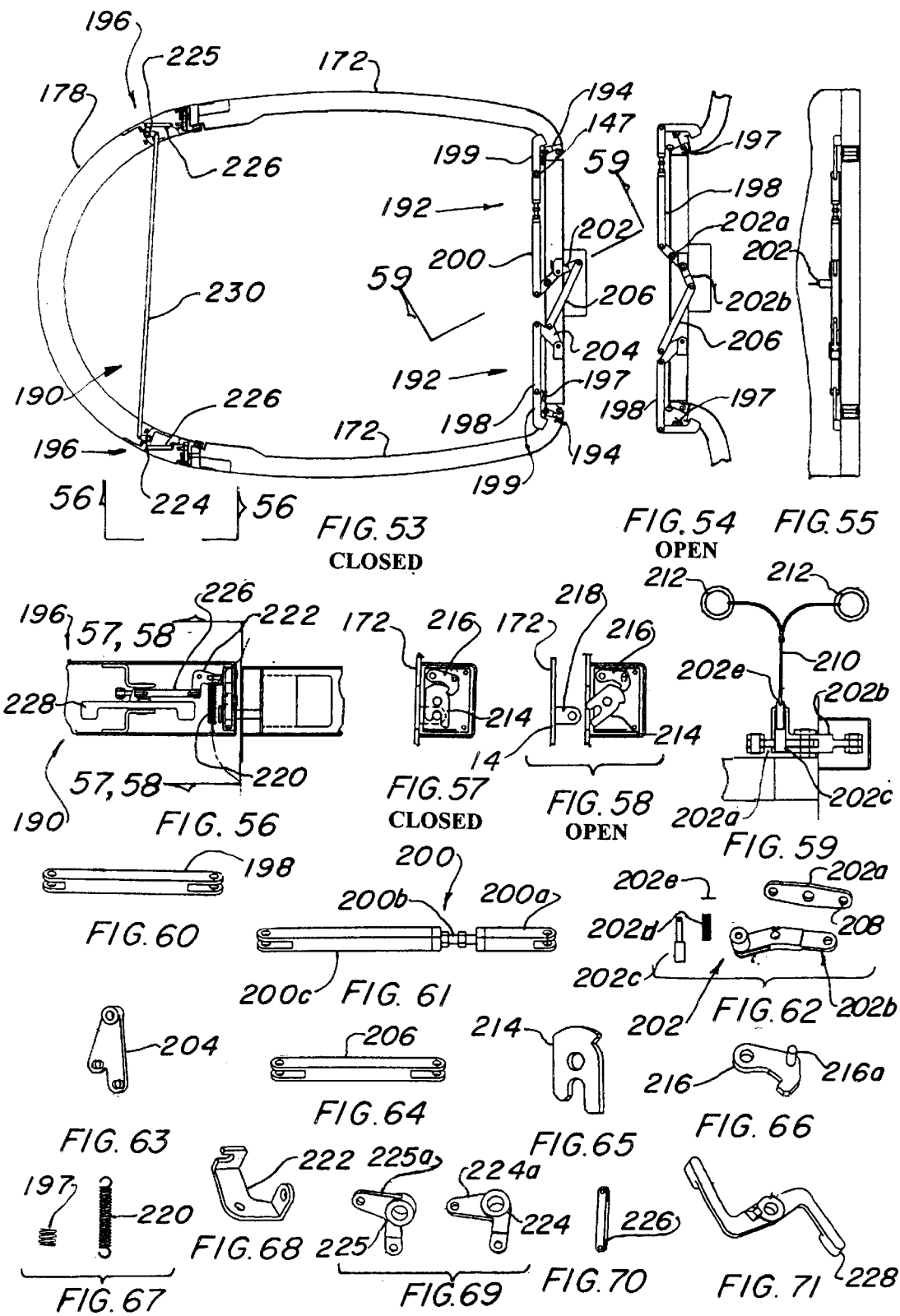

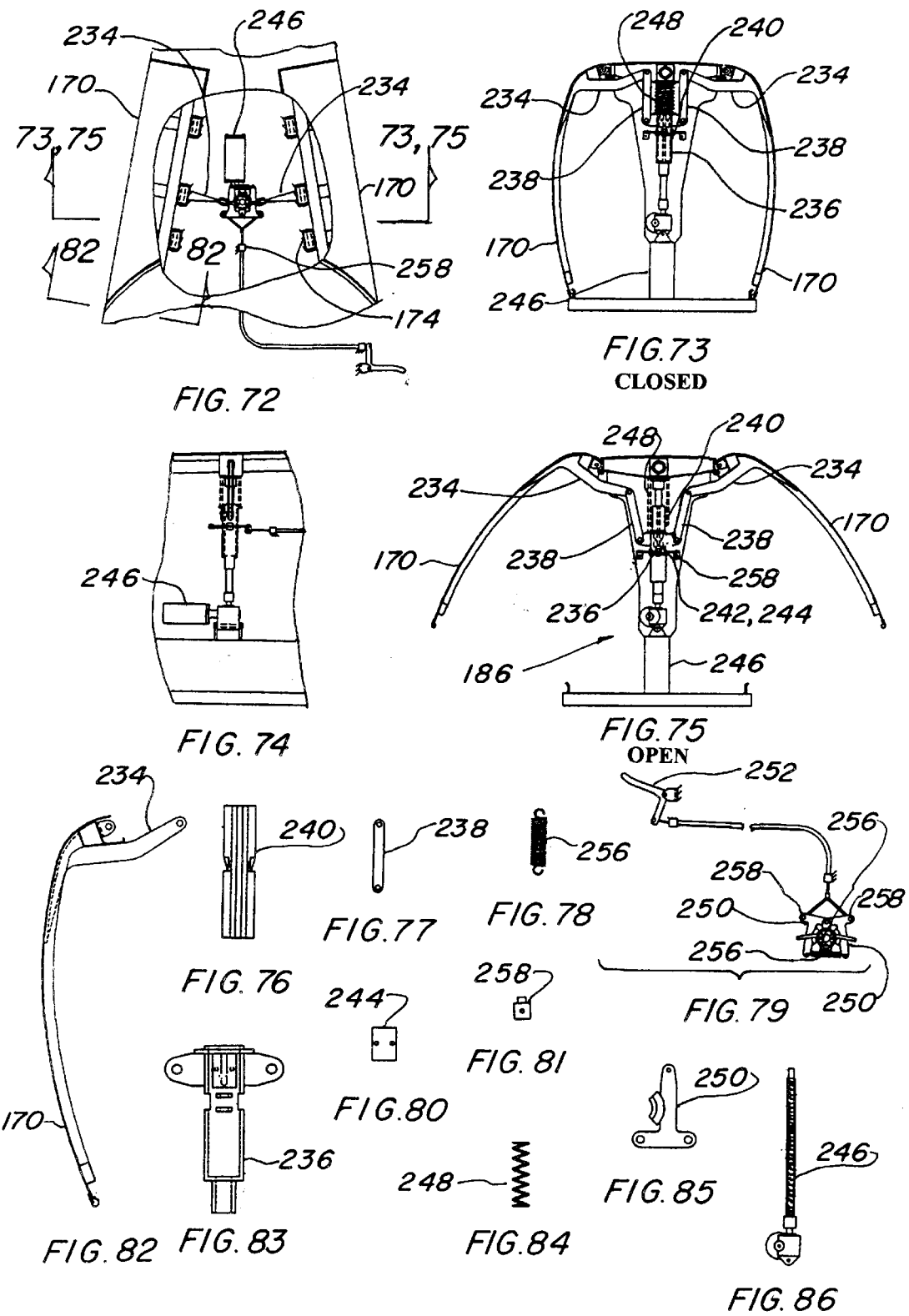

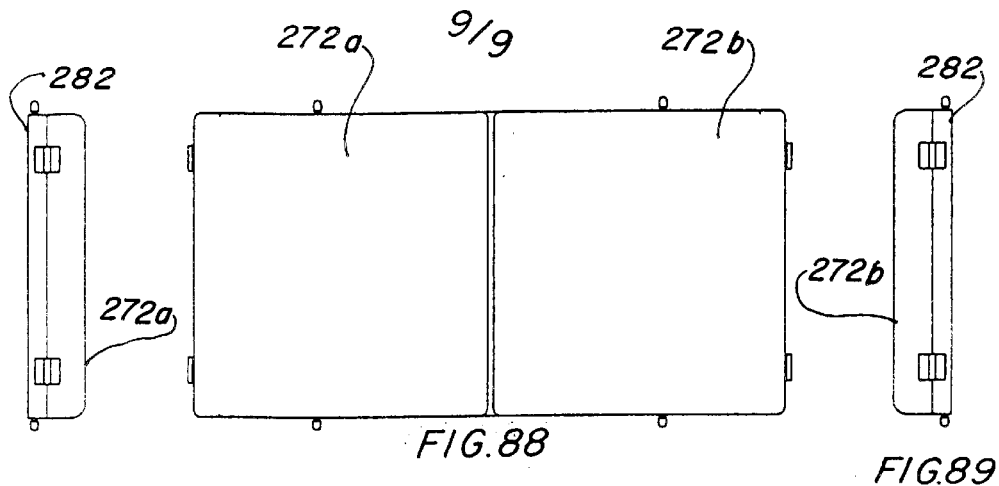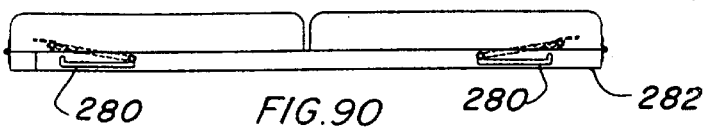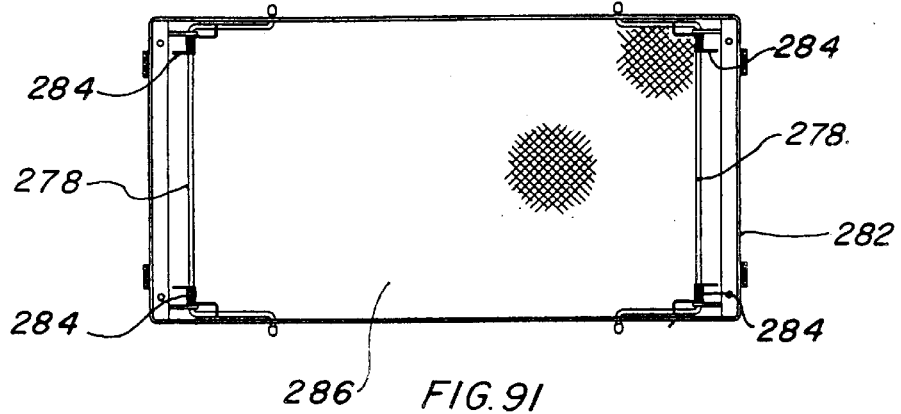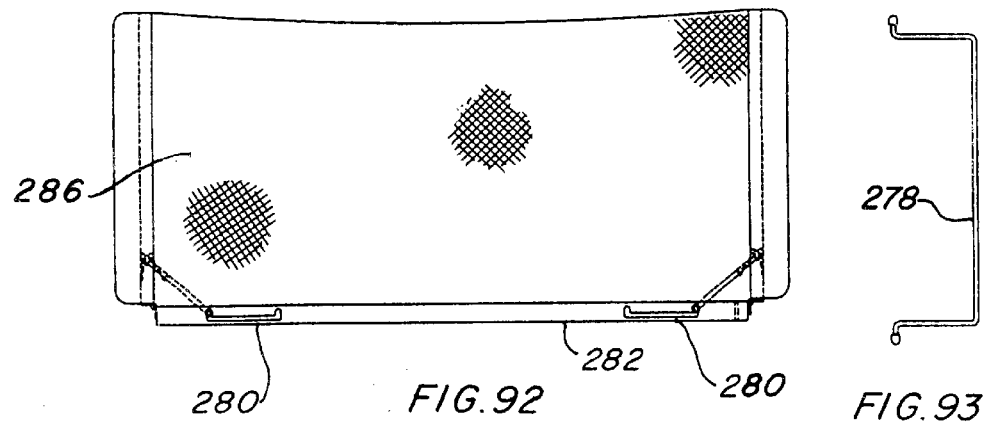

ENCLOSED MOTORCYCLE

TECHNICAL FIELD

The present invention relates to motorcycles in general. More specifically to a motorcycle that is fully enclosed, includes entrance and leg doors, utilizes outrigger wheels and has the majority of features as that of a passenger automobile.

BACKGROUND ART

Previously, many different types of motorcycles have been used in endeavoring to provide an effective means to provide means of transportation. In most prior art stabilizing outrigger wheels have been used to eliminate the need for the driver to touch the road with his feet when stopped or moving very slowly and enclosures to protect the motorcycle driver from the adverse environmental conditions are common in the art.

A search of the prior art did not disclose any patents that possess the combined novelty of the instant invention, however the following U.S. patents are considered related:

| Patent Number | Inventor | Issue Date |
| --- | --- | --- |
| 5,401,055 | Pham | Mar. 28, 1995 |
| 5,181,740 | Horn | Jan. 26, 1993 |
| 5,029,894 | Willman | Jul. 9, 1991 |
| 4,133,402 | Soo Hoo | Jan. 9, 1979 |
| 3,700,059 | Sutton | Oct. 24, 1972 |

Pham in U.S. Pat. No. 5,401,055 teaches a center tracking motor vehicle and a body enclosing the occupants. The vehicle is stabilized at slow speeds by a pair of outrigger struts and retractable wheels mounted on both sides at its mid length. The outrigger struts and retractable wheels may be swing outward to increase the track when necessary in adverse weather or road conditions. The outriggers have the capability to lift the vehicle upright should it inadvertently fall flat on its side.

U.S. Pat. No. 5,181,740 issued to Horn is for a vehicle with tandem wheels. A pair of auxiliary road wheels are positioned on each side of the vehicle and are held by extending pivot arms which are lowered during low speed travel and when the vehicle is stationary. At the raised position the road wheels extend to ride on the roadbed when the vehicle is tilted sidewardly in an inclined position. The vehicle is in an inverted teardrop configuration tapering both in the front and rear. A spoiler flap on the rear is actuated concurrently with the vehicle brake system.

Willman in U.S. Pat. No. 5,029,894 discloses a conventional motorcycle with retractable stop support side wheels parallel with the rear wheel of the vehicle. The side wheels lock in place when down during stop and start driving and when parked. Hydraulic cylinders activate the struts on which the side wheels are pivotally positioned. Manual or automatic operation with selective speed up and down actuation is optionally taught.

Soo Hoo in U.S. Pat. No. 4,133,402 teaches a side wheel outrigger assembly for each side of a motorcycle that is mounted on an arm which in turn is pivotally connected to a mounting plate on the vehicle. A strut is fixed to the arm and extends for supporting the wheel mounted on the outward end. A hydraulic cylinder is connected to the arm with a conduit connected the interior of the cylinder allowing the piston to move within the cylinder during normal operation and absorb impacts encountered by the wheel. A valve interrupts the flow of fluid to the cylinder to prevent the wheel from moving relative to the mounting plate allowing the wheel assembly to become rigid. The side wheels fold up and in when not in use.

U.S. Pat. No. 3,700,059 issued to Sutton is for a motor vehicle with tandem wheels and a pair of wheels on the longitudinal axis secured by struts. Coupling means synchronize the steering mechanism with the position of the side wheels and their retracted and extended position. A motor positions the wheels at the desired level.

DISCLOSURE OF THE INVENTION

In this country automobiles are the most prevalent form of individual over the road conveyance and driving cars to work is a daily routine for most people which congests streets and highways. Furthermore vehicles of this type are historically driven by a single person because of the diverse location of the industry and business making carpooling difficult and not a viable alternative solution. It is also understood that burning high volumes of fossil fuel, as required by today's automobiles, subjects the environment to gradual deterioration such as the problem of global warming that has been recently found to exist. It is therefore a primary object of the invention to utilize a fuel efficient motorcycle that encloses the drivers body protecting it from wind and traffic noise and does not require physically touching the ground by the driver when stopped. The greatest advantage to this invention is that the driver is positioned inside the vehicle with basically all of the conveniences of an automobile but on a much smaller scale.

An important object of the invention is that the enclosed motorcycle with its narrow width permits two similar vehicles to travel side by side in one car lane on the busy highway or freeway to reduce congestion, allowing all vehicles to operate at higher speeds with better fuel economy particularly on congested freeways.

Another object of the invention may be achieved if there is an abundance of this type of vehicle an additional marking could be added by the government to a conventional lane at a quarter position from the lane dividing lines functioning as a pair of motor cycle lanes. Each motorcycle lane could consist of narrowly spaced double lines allowing the driver to see and position the front wheel with in the space. This additional lane would encourage two motorcycles to travel side by side in one car lane while permitting each motorcycle to maintain a safe distance from each other. Traffic signs could be posted along congested sections of the highway or freeway informing the driver that during the rush hour that all motorcycles must use the designated lanes thereby reducing traffic density dramatically. The motorcycle has a much longer wheel base requiring a larger steering angle to accomplish a given turning radius than a conventional motorcycle. Due to its low seating, the driver is less able to sense unstable tilts which makes the motorcycle harder to steer and therefore less agile. Like anything new however, the driver will become accustomed to its new characteristics. In actuality the main purpose of the motorcycle is for commuting which has less demand for performance.

Still another object of the invention is realized in conventional parking lots as the space may be used to a better advantage. Speed bumps in parking lots and residential areas could be made motorcycle friendly with a void in the middle allowing the invention and other two wheeled vehicles to pass by easily.

Yet another object of the invention is the lighter weight coupled with an efficient engine the invention burns considerably less fuel than an automobile saving fossil fuel and emitting less emissions into the environment.

A further object of the invention is the cost of the invention would be greatly reduced from that of an automobile and yet the driver would enjoy all of the functional characteristics and accessory availability afforded in today's automobiles.

A final object of the invention is realized in the amount of time saved in traffic, energy saving and initial cost differential.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 17 is a fragmentary view of the steering shaft tilt joint partially cut away for clarity.

FIG. 18 is a side view of the entire handlebar assembly completely removed from the invention for clarity.

FIG. 19 is a side view of the handlebar shaft completely removed from the invention for clarity.

FIG. 20 is a front view of the handlebar assembly completely removed from the invention for clarity.

FIG. 21 is a side view of the steering shaft completely removed from the invention for clarity.

FIG. 22 is a partial isometric view of the fixed housing of the handlebar assembly completely removed from the invention for clarity.

FIG. 23 is a partial isometric view of one of the spherical forks of the handlebar assembly completely removed from the invention for clarity.

FIG. 24 is a partial isometric view of the spherical ball of the handlebar assembly completely removed from the invention for clarity.

FIG. 25 is a partial isometric view of the other spherical fork of the handlebar assembly the same as FIG. 23 also completely removed from the invention for clarity.

FIG. 26 is a partial isometric view of the pivoting housing of the handlebar assembly completely removed from the invention for clarity.

FIG. 27 is a partial isometric view of the open collar with flanges of the handlebar assembly completely removed from the invention for clarity.

FIG. 28 is a partial isometric view of the eyebolt of the handlebar assembly completely removed from the invention for clarity.

FIG. 29 is a partial isometric view of the cam handle of the handlebar assembly completely removed from the invention for clarity.

FIG. 30 is a view looking downward on the brake assembly with the brake pedal in the engaged position, completely removed from the invention for clarity.

FIG. 31 is a view looking downward on the brake assembly with the brake pedal in the disengaged position, completely removed from the invention for clarity.

FIG. 32 is side view of the brake pedal illustrating the adjustment of the pedals location, completely removed from the invention for clarity.

FIG. 33 is front view of the brake pedal as shown in FIG. 32.

FIG. 34 is a partial isometric view of the brake pedal arm of the brake pedal assembly completely removed from the invention for clarity.

FIG. 35 is a partial isometric view of the brake pedal pad of the brake pedal assembly completely removed from the invention for clarity.

FIG. 36 is a partial isometric view of the pivot arm of the brake pedal assembly completely removed from the invention for clarity.

FIG. 37 is a partial isometric view of the step shaft of the brake pedal assembly completely removed from the invention for clarity.

FIG. 38 is a side view of the compression spring of the brake pedal assembly completely removed from the invention for clarity.

FIG. 39 is a partial isometric view of the brake pedal link of the brake pedal assembly completely removed from the invention for clarity.

FIG. 40 is a partial isometric view of the brake actuating arm of the brake pedal assembly completely removed from the invention for clarity.

FIG. 41 is a partial isometric view of the rod connecting yoke of the brake pedal assembly completely removed from the invention for clarity.

FIG. 42 is a fragmentary view of the outrigger landing wheels shown in the retracted position as viewed looking toward the front of the motorcycle, completely removed from the invention for clarity.

FIG. 43 is a isometric view of the wheel of the outrigger landing wheel assembly completely removed from the invention for clarity.

FIG. 44 is a top view of the outrigger landing wheels shown in FIG. 42.

FIG. 45 is an isometric view of the pivoting nut of the outrigger landing wheel assembly completely removed from the invention for clarity.

FIG. 46 is an side view of the worm gear of the outrigger landing wheel assembly completely removed from the invention for clarity.

FIG. 47 is a fragmentary view of the outrigger landing wheels shown in the retracted position as viewed from the road side of the motorcycle, completely removed from the invention for clarity.

FIG. 48 is a fragmentary view of the outrigger landing wheels shown in the fully extended position as viewed from the road side of the motorcycle, completely removed from the invention for clarity.

FIG. 49 is an isometric view of the landing wheel link of the outrigger landing wheel assembly completely removed from the invention for clarity.

FIG. 50 is an isometric view of the actuating arm of the outrigger landing wheel assembly completely removed from the invention for clarity.

FIG. 51 is a cross sectional view taken along lines 51—51 of FIG. 52.

FIG. 52 is a top view of the landing arm of the outrigger landing wheel assembly completely removed from the invention for clarity.

FIG. 53 is a cross sectional view taken along lines 53—53 of FIG. 3.

FIG. 54 is a partial view of FIG. 53 with the entrance doors open.

FIG. 55 is a end view of FIG. 53.

FIG. 56 is a view taken along lines 56—56 of FIG. 53.

FIG. 57 is a cross sectional view taken along lines 57—57 of FIG. 56.

FIG. 58 is a cross sectional view taken along lines 58—58 of FIG. 56.

FIG. 59 is a cross sectional view taken along lines 59—59 of FIG. 53 showing the safety pin assembly, control cable and rings.

FIG. 60 is an isometric view of the fixed connecting rod of the door hinge link assembly completely removed from the invention for clarity.

FIG. 61 is an isometric view of the adjustable connecting rod of the door hinge link assembly completely removed from the invention for clarity.

FIG. 62 is an exploded view of the safety pin swing arm assembly of the door hinge link assembly completely removed from the invention for clarity.

FIG. 63 is an isometric view of the swing arm of the door hinge link assembly completely removed from the invention for clarity.

FIG. 64 is an isometric view of the diagonal connecting rod of the door hinge link assembly completely removed from the invention for clarity.

FIG. 65 is an isometric view of the lock plate of the door latch assembly completely removed from the invention for clarity.

FIG. 66 is an isometric view of the spring loaded locking arm of the door latch assembly completely removed from the invention for clarity.

FIG. 67 is an side view of the third tension spring of the door latch assembly and the door arm compression spring completely removed from the invention for clarity.

FIG. 68 is an isometric view of the latch pivoting arm of the door latch assembly completely removed from the invention for clarity.

FIG. 69 is an isometric view of the curbside and roadside latch arms of the door latch assembly completely removed from the invention for clarity.

FIG. 70 is an isometric view of the connecting rod of the door latch assembly removed from the invention for clarity.

FIG. 71 is an isometric view of the latch handle of the door latch assembly removed from the invention for clarity.

FIG. 72 is a partial top view of the motorcycle with the enclosure cut away to illustrate the leg door hinge and latching mechanism.

FIG. 73 is a cross sectional view taken along lines 73—73 of FIG. 72 with the leg doors closed.

FIG. 74 is a partial inside view of the leg door hinge and latching mechanism viewed from the road side.

FIG. 75 is a cross sectional view taken along lines 75—75 of FIG. 72 with the leg doors open by spring force.

FIG. 76 is an side view of the elongated nut of the leg door hinge and latching mechanism removed from the invention for clarity.

FIG. 77 is an side view of the door link of the leg door hinge and latching mechanism removed from the invention for clarity.

FIG. 78 is an side view of the fourth tension spring of the leg door hinge and latching mechanism removed from the invention for clarity.

FIG. 79 is a top view of the door latch shown in the unlatching position and control lever assembly of the leg door hinge and latching mechanism removed from the invention for clarity.

FIG. 80 is an side view of the cover plate of the leg door hinge and latching mechanism removed from the invention for clarity.

FIG. 81 is an side view of the control cable connector of the leg door hinge and latching mechanism removed from the invention for clarity FIG. 82 is a partial cross sectional view taken along lines 73—73 of FIG. 72 illustrating the leg door and its door arm.

FIG. 83 is an side view of the actuating collar of the leg door hinge and latching mechanism removed from the invention for clarity.

FIG. 84 is an side view of the front door compression spring of the leg door hinge and latching mechanism removed from the invention for clarity.

FIG. 85 is a top view of the door latch of the leg door hinge and latching mechanism removed from the invention for clarity.

FIG. 86 is an side view of the motorized worm gear of the leg door hinge and latching mechanism removed from the invention for clarity.

FIG. 87 is a front view of the external passenger seat with the fold down cargo compartment beneath, completely removed from the invention for clarity.

FIG. 88 is a plan view of the external passenger seat with the fold down cargo compartment beneath, completely removed from the invention for clarity.

FIG. 89 is a rear view of the external passenger seat with the fold down cargo compartment beneath, completely removed from the invention for clarity.

FIG. 90 is a left side view of the external passenger seat with the fold down cargo compartment beneath, completely removed from the invention for clarity.

FIG. 91 is a bottom view of the external passenger seat with the fold down cargo compartment beneath, completely removed from the invention for clarity.

FIG. 92 is a left side view of the external passenger seat with the fold down cargo compartment extended, completely removed from the invention for clarity.

FIG. 93 is a top view of one of the spring loaded links completely removed from the invention for clarity.

BEST MODE FOR CARRYING OUT THE INVENTION

Figure 1:
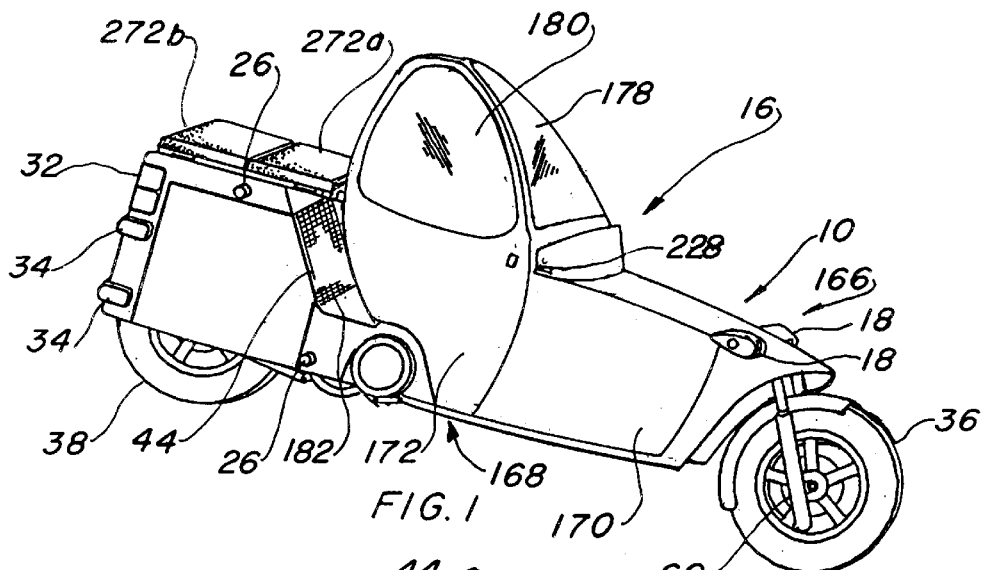
FIG. 1 is a partial isometric view of the preferred embodiment with the landing wheels retracted.

The best mode for carrying out the invention is presented in terms of a preferred embodiment. This preferred embodiment is shown in FIGS. 1 thorough 93 and is consists of an enclosed motorcycle 10 that provides means for transporting a single driver 12. The motorcycle 10, as is the case with all conventional motorcycles, utilizes a structural frame 14 that has sufficient skeletal integrity to surround the driver 12 and provide physical protection. The frame 14 also provides the necessary mounting surface for the means to propel the motorcycle on the road and other necessary components. An enclosure 16, which will be described in detail later, surrounds the frame 14 and provides protection for the driver 12.

The motorcycle 10 includes a pair of side beams 18 integral with the structural frame 14 protruding laterally beyond the basic frame and enclosure 16 on the front above the center of gravity, as shown in FIGS. 1–7 and 12. Each side beam 18 has sufficient strength to support the motorcycle weight when laying flat on its side and subjected to directional forces as encountered in a crash of the motorcycle when in operation. The side beams 18 are streamlined in shape to reduce wind resistance. Each side beam 18 includes a front shock mount 25 with a round scraping pad 20 that is located on the outermost end of the beam. The scraping pad 20 is formed of a steel alloy and includes a plurality of spikes 22 protruding therefrom. The spikes 22 are strong enough to cut into a road surface in the event of a crash when the motorcycle 10 is laying flat. For safety purposes the pad 20 is covered with a replaceable, brittle plastic cap 24 which will shatter under impact exposing the spikes 22. The motorcycle 10 further has a pair of round rear shock mounts 26 protruding slightly beyond the widest pair of the enclosure 16 on each longitudinal side adjacent to a rear wheel, as shown in FIGS. 1–6. The rear shock mounts 26 and the front shock mounts 25 with the scraping pads 20 create a three point suspension on each side such that in the event of a crash, where the motorcycle is impacted and rests on its side, the motorcycle rear portion will skid forward toward the original direction of travel allowing impact absorption on the motorcycles rear. The rear shock mounts 26 are made with steel round cups molded with impact rubber. Each cup's face is smooth, slightly crowned and hardened to create less friction when sliding on the roads surface than the scraping pad 20. Each rear shock mount 26 is secured inside a round socket which is connected directly to the frame 14 such that the steel socket transmits the shear force during impact. One rear shock mount 26 is located above and behind the motorcycle center of gravity and the other below at the bottom edge of the frame 14. The center of gravity is therefore located within the triangular area formed by the three protruding elements on each side of the motorcycle with no other parts protruding beyond the enclosure. It will be noted that the center of gravity is based on the vehicle's gross weight with an average driver in sitting position. To expand on the functional capabilities of the system if the motorcycle 10 falls on its side during an accident and is suspended on the above described three points the scraping pad safety cap 24 shatters permitting the spikes 22 to dig into the road's surface creating a elevated drag force, because the rear of the motorcycle is heavier than the front and the rear shock mounts 26 have less coefficient of friction which allows the entire motorcycle to pivot on the scraping pad 20 placing the rear of the motorcycle forward and if anything stops the sliding movement the rear end will hit the object first. The rotation of the motorcycle to swing its rear end forward will be likely in the direction that the bottom of the motorcycle in the leading side and its top in the trailing side, because the shock mount 25 is located higher than the center of gravity.

Front headlights 28 and turn signal indicators 30 are located on the forward edge of the side beams 18 and tail lights 32 are mounted near the top of the rear end corners of the enclosure 16. Two bumpers 34 are mounted on the enclosures rear portion to protect the rear end of the motorcycle 10 with both bumpers in structural communication with the frame 14. The lower bumper 34 is preferably the same height as the center of the wheel and the upper bumper 34 is at a height compatible with automobile front bumper.

As with any motorcycle tandem wheels are utilized, a front steerable wheel 36 and a rear drive wheel 38 both of which are rotatably attached to the frame 14 and create the necessary mobility for the motorcycle. The driver 12 sits between the two wheels and is totally enclosed and supported by the structural frame 14. Both the front wheel 36 and the rear wheel 38 include integral brakes preferably the hydraulic disc type which are already well known in the art and in present usage therefore is not necessary for them to be specifically illustrated in the drawings. The wheels are also of one of the conventional motorcycle type which also precludes specific illustration as any wheel type is acceptable in the invention.

An engine 40 is provided for rotating the rear drive wheel 38 and it is securely affixed upon the frame 14 to provide propulsion means for the motorcycle 10. The engine 40 is also well known in the art and there are many styles and types that will function properly however it is preferable to have some features that are almost mandatory such as being the gasoline fueled, water cooled, inclined, four stroke cycle type having an electric starter, a mechanical drive assembly 42 from engine to rear wheel and an automatic transmission with a low speed reverse gear. The mechanical drive assembly 42 may be a direct drive, a chain drive or a belt drive all of which will function properly and are in present use in conventional motorcycles. For efficiency reasons it is preferable to have fuel injection as a feature of the engine. The engine 40 is mounted on the main frame 14 forward of the rear wheel 38 and is inclined to conserve space. At least one radiator 44 is provided for transferring heat from the liquid coolant to cool the engine remotely. The radiator or radiators 44 are located on one or both sides of the engine 40 in a indentation in the enclosure 16 as shown in FIGS. 1 and 4–6.

A handlebar assembly 46 is attached to the front wheel 36 on a first end 48 and positioned in a convenient location to the driver on a second end 50 for steering the motorcycle. The handlebar assembly 46 consists of tilting means 52 and pivoting means 54 allowing the handlebar assembly 46 to be positioned convenient to the driver 12. The tilting means 52, as shown in FIG. 18, utilizes a tilt releasing lever 56 that permits the handle bar assembly 46 to the tilted up or down and be locked in a fixed position. The pivoting means 54, as also shown in FIG. 18, consists of a steering bar clamping handle 58 which permits the handle bar assembly 46 to be oriented at a angular displacement convenient to the driver 12. It will be noted that the motorcycle front wheel 36 is mounted on a spring shock absorber 60 system with the axle above the lower end with the axle on the side of the shock absorber system 60 allowing the utilization of a longer than conventional cylinder housing. The front wheel steering mechanism consists of a double universal joint 62 coupling the top of the shock absorbers on one end and to a steering shaft 64 on the other to ensure smooth rotation. A steering shaft tilt joint 66 is mounted between the steering shaft 64 and a handlebar shaft 68 which is attached to a steering handlebar 70. Both the steering shaft 64 and the handlebar shaft 68 that communicate with the steering shaft tilt joint 66 have a male spline 72 with a threaded hole in the end.

The steering shaft tilt joint 66 consists of a fixed housing 74 over the steering shaft 64 and a pivoting housing 76 over the handlebar shaft 68 each employing a pair of bearings 78. The pair of bearings are used instead of a single bearing to ensure the ends of the shafts transmit force as well as moment to their supporting housings. Each shaft end engages a spherical fork 82, illustrated in FIGS. 23 as 82a and 25 as 82b, as the forks 82 are identical and each include a female spline that interfaces with the male spline 72 of the shafts 64 and 68. The housings 74 and 76 seat at the outside diameter of the bearings and the forks 82 seat on the inside diameter of the bearings and engage with the shafts 64 and 68 which are secured by conventional cap screws 80. A spherical ball 84, illustrated in FIG. 24, having opposed grooves at 90 degree apart, receive the radial legs of the forks 82a and 82b allowing the steering shaft tilt joint 66 to pivot easily. The bottom of the pivoting housing 76 contains gear teeth as illustrated in FIGS. 17 and 26 which mate with teeth formed into the tilt releasing lever 56 which is hingeably attached to the frame 14. With the lever 56 engaged the handlebar shaft 68 is in a fixed position and when the lever 56 is manually depressed the teeth disengage and the handlebar shaft 68 may be pivoted upward or downward to any desired height. To minimize the effect of holding the weight of the steering bar assembly during the adjustment, a spring may be used to counteract gravity. The pivoting housing 76 pivots in the axis through the center of the spherical ball 84 and its gear teeth are formed with their centerline on the axis.

The end of the handlebar shaft 68, toward the rear of the motorcycle, curves upward to a convenient height for the driver 12 and supports the handlebar 70 with a quick release device in the form of an open collar with flanges 86 configured in a hollow tee shape. The handlebar 70 is disposed through the collar 86 and is held in place by tensioning an eyebolt 88 attached to a cam handle 90. The eyebolt 88 threadably engages a conventional hex nut secured on the collar 86 and the handle 90 includes a radially shaped cam head, as shown, which engages the collar and tensions the handlebar 70 within the collar 86. The surface of the handlebar 70 and an inner face of the collar 86 are serrated where they contiguously engage each other to insure a tight grip. To adjust the position of the handlebar 70, the cam handle 90 is pulled upwardly which loosens the collar 86 permitting the handlebar 70 to rotate and reorient to any desired position as shown in FIG. 18. To complete the handlebar assembly 46, a right handlebar grip 92 performs as an accelerator and a hand brake and a left handlebar grip 94 achieves transmission shifting. Details of the grips 92 and 94 are not described nor illustrated as they are well known in the art and in common usage.

A foot brake pedal assembly 96 is pivotally affixed to the frame 14 and linked to a conventional hydraulic front and rear wheel brake for stopping the movement of the motorcycle. An adjustment brake pedal release handle 98 permits the foot brake pedal to be adjusted to an angular displacement convenient to the driver. The foot brake pedal assembly 96 is, pictorially illustrated in FIGS. 30–41, consists of a brake pedal arm 100 with a brake pedal pad 102 pivotally attached on one end. The top of a brake pedal arm 100 pivots on a step shaft 104 which is able to slide on the frame 14. The brake pedal arm 100 contains an annular section of radially oriented triangular teeth 106 which engage with similar teeth 106 on a brake actuating arm 108. To ensure positive braking without slippage, on each tooth one face lie in the axial direction and the other is slanted. During the braking action, the face in the axial direction engages for transmitting torque. This brake actuating arm 108 also pivots on the step shaft 104 and is bifurcated to attach to a push rod 110 which interfaces with a conventional master brake cylinder 112, as illustrated in FIGS. 30–32. The brake pedal arm 100 has a side arm 114 connected to a first tension spring 116 which urges the pedal arm 100 to swing toward the rear of the motorcycle 10. A brake compression spring 118 resides in a radial recess adjacent to the triangular teeth 106 in both the pedal arm 100 and the brake actuating arm 108 and is disposed around the shaft 104. The engaging sides of the triangular teeth 106 are in mirror image and a shoulder on the shaft 104 rests on the pedal arm 100 with the opposite end of the shaft 104 connected to a brake pedal link 120 which has its opposite end connected to a pivot arm 122. The brake pedal link 120, arm 122 and shaft 104 are in alignment when the teeth 106 are engaged. The pivot arm 122 includes an integral secondary arm 124 that connects to a rod connecting yoke 126 which in turn connects to the pedal releasing handle 98 located inside the enclosure with a tension rod 128. The pivot arm 122 also connects to a second tension spring 130 which forces the arm 122 and brake pedal link 120 to align with the shaft 104 with the rod connecting yoke 126 resting on the brake pedal link 120 functioning as a stop. When the pedal release handle 98 is rotated toward the rear of the motorcycle 10 the brake pedal link 120 and arm 122 collapse to move the shoulder of the step shaft 104 axially away from the pedal arm 100 which in turn is forced to disengage from the actuating arm 108 as urged by a brake compression spring 118 and rotates rearwardly as forced by a first tension spring 116. To adjust the brake pedal 96 to fit the driver 12, the release handle 98 is pulled allowing the pedal arm 100 to swing to the rear and stop at the desired position, when released, the handle 98 automatically locks the brake arm 100 in place.

Figure 4:
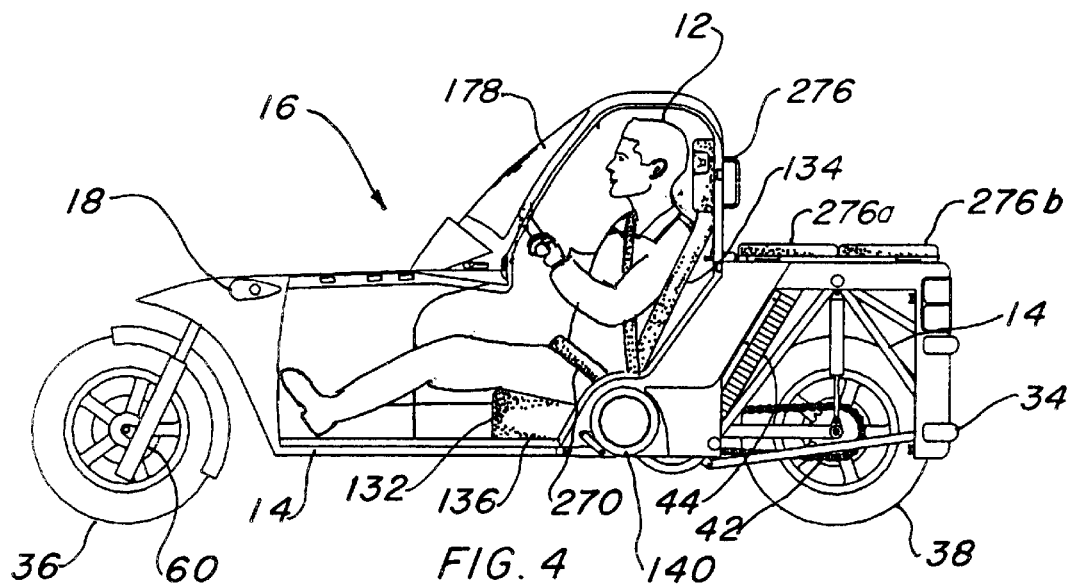
FIG. 4 roadside view of the preferred embodiment with the landing wheels retracted and the doors and engine compartment enclosure removed to show interior structure. also a driver is illustrated in the seated position.
Figure 7:
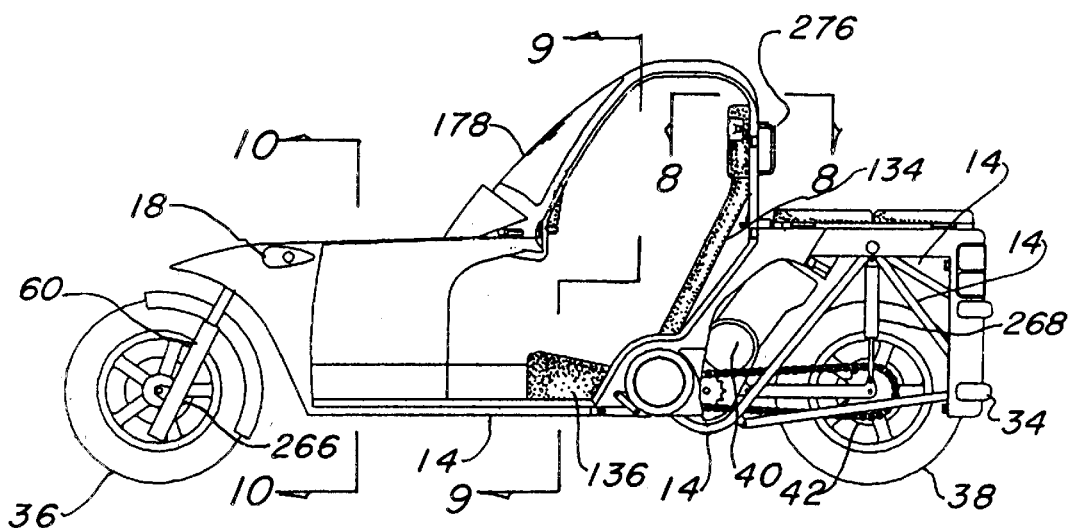
FIG. 7 is a roadside view of the preferred embodiment with the doors and panels removed to show the internal construction of the motorcycle.

A bench seat 132 is rigidly attached to the frame 14 for seating the driver 12 with the bench seat 132 positioned in a fixed location and it is preferred that the seat 132 is defined as having a separate backrest 134 and a separate seat 136 cushion as shown in FIGS. 4 and 7 however a single one piece bench is also an acceptable alternate. The seat 132 is well known in the art and many different types may be easily utilized all of which are already in use by the public. The seat 132 is positioned as low as possible to minimize the height if the motorcycle 10 and its front protection area to reduce wind drag. Also the driver can touch his feet to the ground with the leg doors 170 open.

Figures 9, 10, 11:
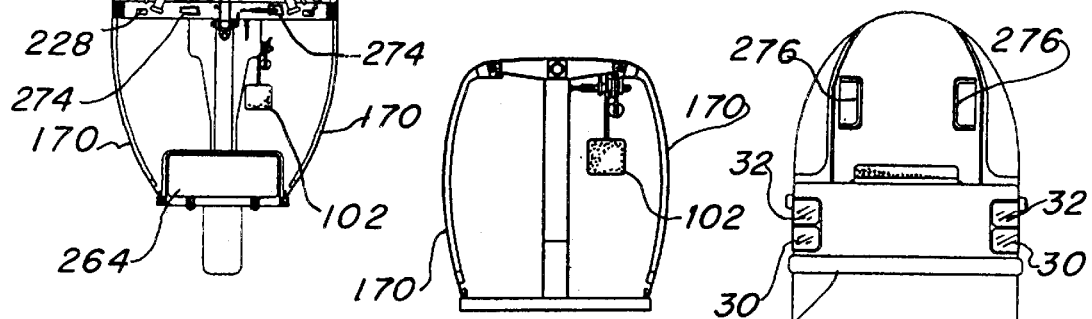
FIG. 9 is a cross sectional view taken along lines 9—9 of FIG. 7 with the doors in the closed position.
FIG. 10 is a cross sectional view taken along lines 10—10 of FIG. 7 with the doors in the closed position.
FIG. 11 is a rear view of the preferred embodiment with the landing wheels lowered.
Figure 12:
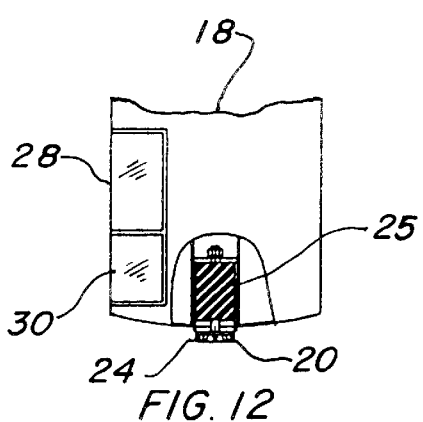
FIG. 12 is an fragmentary cross sectional view of one of the shock mounts installed in one of the side beams.

A pair of electrically actuated outrigger landing wheels 138 are attached to the frame 14 and have a track such that the outer faces of the wheels 138 are spaced equal to the widest part of the enclosure as shown in FIG. 11. The landing wheels 138 are rotatably attached to their individual axle, with one single wheel 140 on each side of the motorcycle 10. The landing wheels 138 have automatic control that extends both wheels simultaneously, at a predetermined road speed, so as to be in close proximity to the surface upon which the motorcycle 10 is resting for preventing tipping at low speeds and to maintain stability when stopped. The outrigger landing wheels 138 have height adjustment means from the surface upon which the motorcycle rests, based on the drivers physical weight. The wheels 138 are held in a retracted position not interfering with the motorcycles driving ability however as the motorcycle 10 slows down to a speed which is arbitrarily predetermined normally, from 3 to 6 miles per hour (4.8 to 9.6 kilometers per hour) the wheels extend and quickly touch the ground allowing the motorcycle to handle like an automobile. The predetermined speed is based on the dynamic stability of the motorcycle 10 on the landing wheels 138. Speed sensors mount on the transmission drive axle to accomplish the control. This feature precludes the driver 12 from the necessity of stretching his feet away from the motorcycle 10 during a stop. Further, the landing wheels 138 will be maintained in the lowered position whenever the automatic transmission is shifted into reverse gear using conventional controls.

The wheels 138 and height adjusting means are best illustrated in FIGS. 42–52 with each wheel 140 mounted at one end of a structurally rigid landing arm 142 that includes a pair of upwardly extending hinge arms 144 as illustrated in FIGS. 51 and 52. Each hinge arm 144 pivot on to the frame 14 and is connected to a actuating arm 146 with a landing wheel link 148. The middle hole of each actuating arm 146 hinges on the frame 14, as shown, and the other end is bifurcated allowing it to be attached to each end of a pivoting nut 150 which in turn engages a threaded output shaft of a worm gear 152. The opposite end of the worm gear 152 hinges on the frame 14. An electric motor 154 drives both worm gears 152 rotating the actuating arms 146. As both actuating arms 146 rotate the landing wheel links 148 force the landing arm 142 and wheels 140 to pivot.

Since the motorcycle 10 deflects downward under its own weight on its wheels and its conventional shock absorbers integrally formed with the frame 14, it is apparent that the amount of deflection changes when the driver's weight is added requiring two positions, one with the driver and the other with only the motorcycle, such as when it is parked. The swing angle of the landing arm 142 is therefore adjusted remotely using a height adjusting mechanism 156 as shown in FIG. 44. This mechanism 156 is located on the control panel 158 and includes a driver weight calibrated nameplate and a pointing knob. When the driver 12 rotates the knob, an attached height adjustment control cable 160 moves the position of a stop switch 162 mounted on a slide bracket 164 secured to the frame of one of the worm gears 152. When the motor of the worm gear 152 rotates the pivoting nut 150 moves along the worm gears threaded drive shaft until the pivoting pin of the pivoting nut 150 engages the switch 162 stopping the rotation of the worm gear 152. It should be noted that the driver 12 need only to adjust the height adjusting mechanism knob to match his or her weight assuring proper load distribution such that the landing wheels 140 touch the ground at the proper height to support the motorcycle in the upright position permitting the motorcycle wheels to have adequate reactions. When the driver 14 turns off the ignition to the motorcycle and removes the ignition key the landing wheels 140 automatically swing fully to the weight unloaded position for parking as shown in FIG. 48.

The enclosure 16, disposed over and attached to the frame 14, consists of a front housing 166 and a rear housing 168, as indicated in FIG. 1, with the front housing incorporating a pair of leg doors 170 and the rear housing including a pair of entrance doors 172 one on each side of the motorcycle 10 for access to the seat 132 and to minimize the enclosure envelope size. The front housing 166 is lower than the rear housing 168 to permit visibility from the rear housing 168 over the front housing 166. The enclosure 16 is essentially fabricated of fiberglass preferably lined with acoustic insulation which may be covered with fabric for wear and for cosmetic reasons.

The rear housing 168 utilizes a windshield 178 that is positioned in front of the driver 12 and a pair of side windows 180 located within each entrance door 172, on each side of said driver, for visibility. The windshield 178 is made of high strength automotive safety glass permitting clear perceptibility and scratch resistance. To minimize injury to the driver 12 the side windows 180 are optically clear plastic which makes installation and replacement easy.

The rear housing entrance doors 172 have a top, a bottom, a front and a rear, with each door 172 hinging on the rear vertical edge, and the bottom of each door extend below the bench seat 132. The top of the door extends to the housing top allowing easy access into the enclosure 16 for the driver 12. A pair of door latches 196 are mounted to the frame 14 near the front edge of the entrance door 172, as illustrated best in FIGS. 53 and 56.

The entrance doors 172 have interlinked simultaneous entrance door opening and closing means and each pair of leg doors 170 have interlinked simultaneous leg door opening and closing means. A keyed door lock 184 is disposed within the frame 14 adjacent to the front edge of the road side entrance door 172 for security reasons.

The entrance doors 172 hinge on their upper vertical rear edges on the frame 14 and are connected with a hinge link 192 allowing them to move in concert to open and close. The link 192 consists of a fixed connecting rod 198 illustrated in FIG. 60, an adjustable connecting rod 200 shown with its detailed components in FIG. 61, a safety pin swing arm assembly 202, shown with its detailed components in FIG. 62, a swing arm 204 hinged on the frame 14 depicted by itself in FIG. 63 and a diagonal connecting rod 206 shown in FIG. 64. The safety pin swing arm assembly 202 consists of a pin hole arm 202a, and a safety pin arm 202b, the end hole 208 on the pin hole arm 202a and the middle hole on the safety pin arm hinge on a common pin secured to the frame 14. The upper member of the safety pin arm 202b includes a vertical housing containing a step pin 202c loaded against a compression spring 202d. The pin hole arm 202a is locked together with the safety pin arm 202b with the step pin 202c. The connecting rod 198 fastens the road side entrance door 172 to the swing arm 204 and the diagonal connecting rod 206 connects the swing arm 204 to the safety pin arm 202b. The adjustable connecting rod 200 attaches the pin hole arm 202a to the curb side entrance door 172. With proper selection of the hole locations on the safety pin arm 202b and the swing arm 204 connecting to the diagonal connecting rod 206, both entrance doors 172 achieve the same amount of full opening.

The top of the pin 202c connects to a control cable 210 which branches into two parts with each end containing a handle ring 212, as shown in FIG. 59. One handle ring 212 is located inside the canopy near the top within reach of the driver 12 and the other on the outside of the enclosure 16 accessible to rescue personnel. When either of the rings 212 are pulled the pinhole arm 202*a* disengages with the safety pin arm 202*b* and both entrance doors 172 are independently operable.

The adjustable connecting rod 200 consists of two short rods 200*a*, 200*c* and an adjusting screw 200*b* with right hand threads on one end and left hand threads on the other which engage mating holes in the rods 200*a*, 202*c*. By rotating the adjusting screw 202*b* the length of the adjustable connecting rod 200 may be adjusted such that both entrance doors 172 latch simultaneously at their front edges. In the event of a crash with the motorcycle 10 landing on its side the driver 12 simply pulls the ring 212 enabling him or her to unlatch and lift the upper door to escape or rescuers on the outside may do the same thing. A compression spring 197, shown in FIG. 67, is secured to each entrance door arm 199 such that, when the entrance doors 172 are unlatched, both doors 172 will pop open slightly.

Entrance door latching means 190 connect both entrance door latches together with a latch link such that unlatching either door with the latching means unlatches both doors simultaneously.

Entrance door latching means 190 consists of two door latches 196 mounted on the frame 14 engaging the front edge of each door 172. This latch consists of a lock plate 214 pivoting on the frame 14, with the plate having an integral notch engaging a spring loaded locking arm 216 and a slot engaging a locking pin 218 mounted on the door 172, shown best in FIGS. 56–58. The locking arm 216 is also hinged on the frame 14 and has a lateral pin 216*a* that engages a third tension spring 220 and a latch pivoting arm 222. The third tension spring 220 forces the locking arm 216 to tilt toward the lock plate 214. The latch pivoting arm 222 also hinges on the frame 14 and connects to a latch arm 224 with a connecting rod 226.

The latch arm 224 rests on a stop of a latch handle 228 and both latch arms 224 and handle 228 hinge on a integral common fixed shaft secured to the frame 14. When the handle 228 is pulled the latch arm 224 rocks the pivoting arm 222 which raises the locking arm 216 to disengage from the lock plate 214. The door 172 may then be pushed to open with the locking pin 218 sliding on the open slot on the lock plate 214 moving it out of the way. After the door is opened the lock plate 214 remains in the open position held by the urging of the locking arm 216. A small notch may be added on the lock plate 214 for the locking arm 216 to engage for holding the lock plate 214 in an open position.

Figure 2:
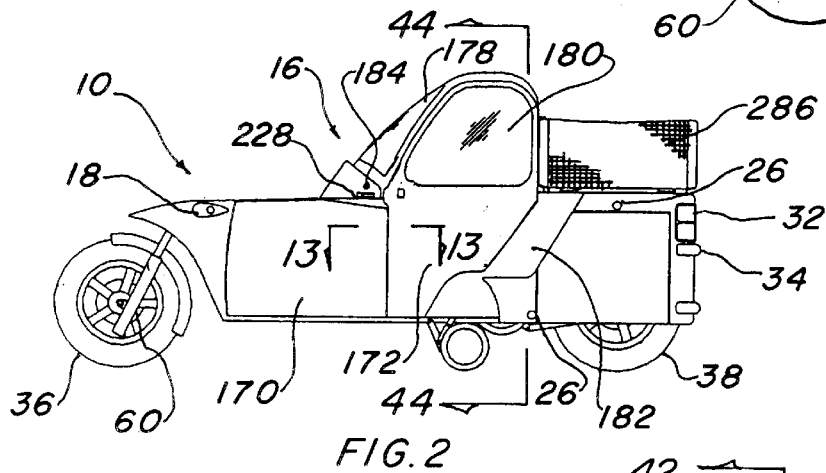
FIG. 2 is a roadside view of the preferred embodiment with the fold down cargo compartment hinged upward in the open position and the landing wheels lowered.
Figure 3:
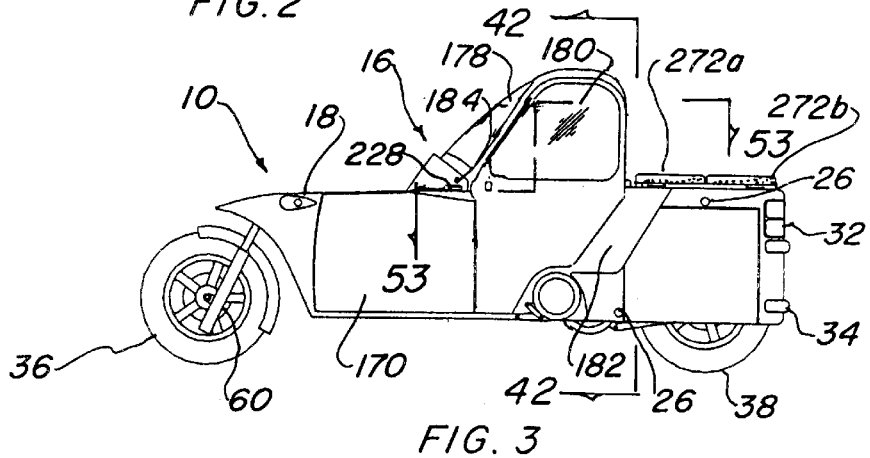
FIG. 3 is a roadside view of the preferred embodiment with the landing wheels retracted.

When the door is closed the locking pin 218 slides into the open slot of the lock plate 214 and forces it to tilt until the locking arm 216 engages in the notch on the lock plate 214 completing the locking procedure. The latch arm 224 includes a side arm 224*a* that connects to a side arm 225*a* of the mating latching arm 225 on the opposite door utilizing a diagonal connecting rod 230 as illustrated attached in FIG. 53. When the latch handle 228 on either door is activated both latch arms 224 are affected to unlock both doors simultaneously. The door lock 184 shown located in FIGS. 2 and 3 is added to cause the latch arms 224 and 225 to be inoperative. With the proper selection of the length and orientation of the side arms 224*a* and 225*a* both arms will achieve the same amount of rotation when the latch handle 228 is pulled to its full stroke.

The leg doors 170 of enclosure front housing include a top, a bottom, a front and a rear, with each door having a plurality of hinges 174 on the top horizontal edge, and the top of each door taper toward the motorcycle front such that the doors 170 open in a forward tapered angular relationship toward the motorcycle's front, allowing easy access into the enclosure 16 for the driver, appropriate interface engagement with the entrance door 172 and a streamline housing thereby reducing wind drag.

Leg doors 170 have an electric power door release 186 actuated by an electrical switch for opening and closing, additionally a spring force door release actuated by a lever within the enclosure 16, is provided for opening both leg doors 170 during an emergency.

Each leg door 170 hinges on the upper edge to the frame 14, as shown in FIGS. 73 and 75 and an integral door arm 234 extends from the upper end of each door 170 and connects to one side of an actuating collar 236 with a door link 238. The core of the collar 236 contains a elongated round hole which engages with a elongated nut 240. The nut 240 has a longitudinal keyway that engages with a conventional key 242, mounted on the collar 236 and covered by a cover plate 244 such that the collar 236 can slide downward on the nut 240. This arrangement is illustrated assembled in FIGS. 73 and 75 however the key 242 is not illustrated separately as it is well known in the art.

A threaded hole in the nut 240 engages with a threaded output shaft of a motorized worn gear 246 mounted on the frame 14. A front door compression spring 248 rests against the top flange of the collar 236 and contains sufficient compressive force to open both doors 170 simultaneously. A pair of door latches 250 are attached to and hinge from the actuating collar 236 and catch into two tapered grooves in the elongated nut 240 such that when the latch 250 is caught, the collar 236 stays with the nut 240. The door latch 250 is actuated remotely by a control lever 252 mounted on the instrument control panel 158 within easy reach of the driver 12.

A conventional electrical control switch, not shown, located on the instrument control panel 158 energizes the worm gear 246 which moves the nut 240 and collar 236 vertically to either close or open the doors 170. During an emergency the control lever 252 will release the latch 250 from the nut 240 and the spring 248 will force the collar 236 to slide downward away from the nut 240 and spring the doors 170 open; as shown in FIGS. 75 and 79. A fourth tension spring 256 pulls the door latches 250 to close and two cable connectors 258 completes the assembly of the door latch 250. The engagement of the collar 236 to the nut 240 is sufficiently long to ensure that they do not slide apart and disengage from each other totally. The bottom of the collar 236 includes a small hole that confines the shaft of the worm gear 246 assuring a smooth interface.

Figure 13:
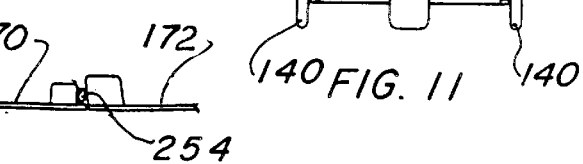
FIG. 13 is a cross sectional view taken along lines 13—13 of FIG. 2.
Figure 14:
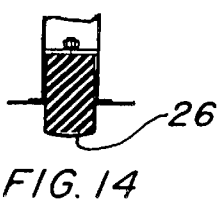
FIG. 14 is an arbitrary cross sectional view of one of the shock mounts.
Figure 15:
FIG. 15 is a partial isometric view of one of the scraping pads completely removed from the invention for clarity.
Figure 16:
FIG. 16 is a partial isometric view of one of the safety caps completely removed from the invention for clarity.

The front edge of each entrance door 172 and the rear edge of each leg door 170 employ a gasketed seal 254, as shown in FIG. 13 to create a watertight junction therebetween without structural backings of the frame 14 allowing the driver 12 to stretch his or her legs inside the leg doors 170 from outside during seating.

To get into the motorcycle 10 both pairs of leg and entrance doors, 170 and 172 are placed in the open position with the leg doors 170 opening first followed by the entrance doors 172. The rear edge of the leg door 170 engages with the front edge of the entrance door 172 and are sealed with a gasketed seal 254 as described above. It should be known that in an emergency the entrance door 172 may be forced open even if the leg door 170 is in the closed position.

For security, the entrance door 172 may contain a keyed door lock 184, as previously described, which locks from the outside however when the occupant is inside the doors are left unlocked to allow escape or rescue from the outside. The door lock 184 is designed such that when a door key is used to unlock the door lock 184 to access the motorcycle 10, the leg doors 170 will open automatically allowing the entrance doors 172 to be unlatched by hand. In reverse, when the door lock 184 is set to lock the entrance doors 172, the leg doors 170 will close automatically.

The enclosure 16 has a recess 182 located behind and formed by a lower portion of each entrance door 172 curving inward with a rearward slanting indented portion of the frame 14. The recesses 182 provide a suitable location for air inlet openings and engine accessories such as the radiators 44 also they furnish space for a passenger's foot. The recesses 182 form a natural air scoop permitting a ram air effect through the radiators 44 when the motorcycle 10 is in motion.

The enclosure 16 preferably includes a ventilation system 274 to introduce ambient air into the enclosure interior for driver comfort. The ventilation system 274 includes but is not limited to a pair of vents open to the front of the enclosure 16 to permit outside air to enter, as depicted in FIG. 9. A conventional automobile type climate control system may be installed, but to save energy, a wearable personalized climate control device such as the ones using the Peltier's effect, or water by evaporation, to be worn on the drivers neck, may be used.

Inside the canopy of the enclosure 16 at least one, but preferably two, convex shaped rear view mirrors 260 are mounted in front of the driver 12 one on the right and the other on the left. The mirrors 260 are slightly curved to provide a wide view with the inside position preferable as exterior mirrors create unnecessary wind drag.

Figure 5:
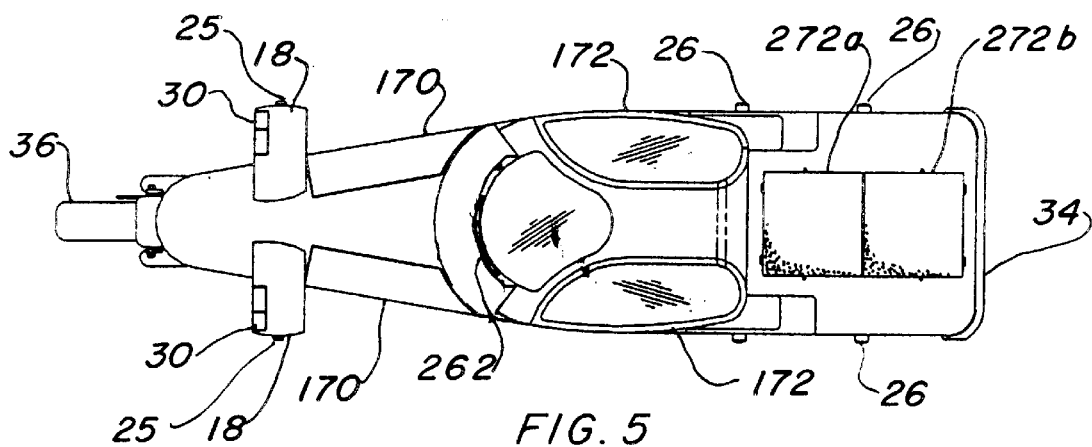
FIG. 5 is a plan view of the preferred embodiment.
Figure 6:
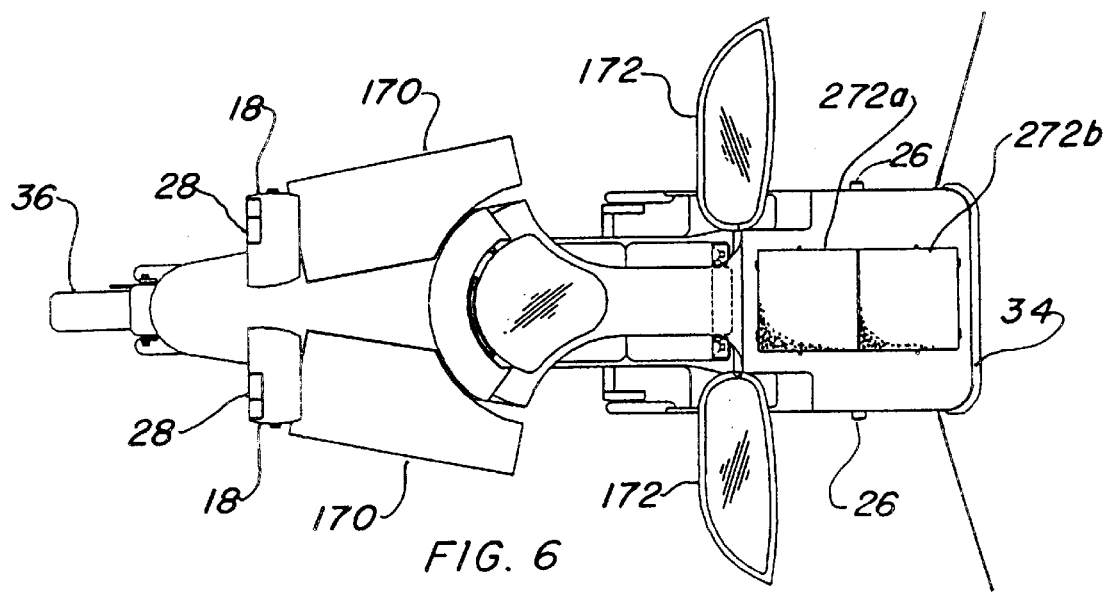
FIG. 6 is a plan view of the preferred embodiment with the entrance doors, leg doors and engine compartment doors open.

A windshield wiper 262 is affixed integrally with the enclosure 16 to clear the windshield 178 from rain and snow and permit visibility under adverse environmental conditions. The wiper 262 is electric powered and installed behind a short wall on the enclosure 16 as illustrated in FIG. 5.

A fuel tank 264 for supplying fuel to the engine 40 is mounted within the frame 14 adjacent to the seat 132 affording protection of the structural frame in the event of a crash. The fuel tank 264 is illustrated best in FIG. 9.

A shock absorber suspension system 60, illustrated in FIG. 7, include front fork shock absorbers 266 and rear wheel shock absorbers 268 to cushion road shock on the motorcycle and provide a comfortable ride.

Safety belt means in the form of an automotive type seat belt 270, as shown in FIG. 4, or a four point support type is installed adjacent to the seat 132 to detain the driver within the motorcycle during operation.

Behind the enclosure canopy directly and above the engine compartment are a pair of spring hinged handles 276 that automatically fold down into cavities formed integrally with the enclosure 16 when not in use by an external passenger. Further a two piece external passenger seat 272 is disposed directly above the engine and includes a fold down cargo compartment underneath such that when the passenger seats 272 are hinged upwardly, the fold down cargo compartment mechanically unfolds providing storage for miscellaneous items or personal effects. Seat 272 is comprised of a front seat 272a and a rear seat 272b with the front seat 272a hinging on the front edge and the rear seat 272b hinging on the rear edge. Each seat has a spring loaded link 278 which has both ends engaged in slots 280 in a seat base frame 282 secured to the structural frame 14. The ends of the slots 280 are notched upwardly and torsion springs 284 on the links 278 force each seat 276 toward the fold down position. Both seats 272 are locked in the folded down or upright position with the link 278 seated in the notches on the slot 280. By forcing down both ends of the link 278 away from the end notches in the slot 280 each seat can be tilted. The fold down compartment consists of a flexible framework 286 of water resistant material which is connected to the bases of both seats 272a and 272b. When both seats are erected to their upright positions the flexible framework 286 of the fold down compartment unfolds itself and becomes a cargo space with a zip open top.

Figure 8:
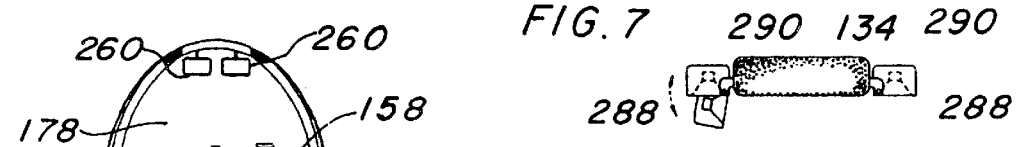
FIG. 8 is a cross sectional view taken along lines 8—8 of FIG. 7 illustrating the speakers on the headrest.

An audio system including a pair of speakers 288 are disposed hingeably on each side of the back rest 134 of the bench seat 132 in close proximity to the drivers head such that sound may be heard above road noise and adjustment made by the driver to position the speakers in the optimum location. The speakers 288 are held in place by friction of a speaker attaching hinge 290 and independently rotate as illustrated in FIG. 8 or the speakers 288 may be connected with a diagonal link so both speakers 288 may be rotated simultaneously.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

What is claiemd is:

1. An enclosed motorcycle providing means for transporting a single driver comprising:

a structural frame, having sufficient skeletal integrity to surround the driver and provide protection of the driver and also a mounting surface for propulsion means, a pair of tandem wheels, defined as a front steerable wheel and a rear drive wheel rotatably attached to said frame for mobility of the motorcycle, with both the front and the rear wheel further having integral brakes, an engine for rotating said rear drive wheel, securely affixed upon said frame to provide propulsion means for the motorcycle, a handlebar assembly attached to the front wheel on a first end and positioned in a convenient location to the driver on a second end, for steering the motorcycle, a foot brake pedal assembly pivotally affixed to the frame and linked to the front wheel brake and rear wheel brake for stopping movement of the motorcycle, a bench seat rigidly attached to the frame for seating the driver, a pair of electrically actuated outrigger landing wheels, attached to the frame having a track spanning a widest portion of said frame, said landing wheels attached upon a common axle, one on each side of the motorcycle, said landing wheels having automatic control to extend both wheels simultaneously, at a predetermined road speed, so as to be in close proximity to the surface upon which the motorcycle is resting for preventing tipping at low speeds and when stopped, and an enclosure disposed over and attached to the frame, said enclosure having a front housing and a rear housing with said front housing having pair of leg doors and said rear housing having a pair of entrance doors one on each side of the motorcycle for access to the seat and to minimize the enclosure envelope with the front housing lower than the rear housing providing easy entry into the motorcycle and to permit visibility from the rear housing over the front housing, a rear edge of said leg doors mate with a front edge of said entrance doors permitting unrestricted access into the motorcycles interior when seating.

2. The motorcycle as recited in claim 1 further comprising a pair of side beams integral with the structural frame protruding beyond enclosure on front having sufficient strength to support the motorcycle weight when laying flat on its side and subjected to directional forces as encountered in a crash of the motorcycle when in operation.

3. The motorcycle as recited in claim 2 wherein each side beam further comprising a shock mount with a scraping pad of steel alloy which includes a plurality of spikes protruding therefrom for cutting into a road surface in the event of a crash when the motorcycle is laying flat, further said motorcycle having a pair of shock mounts on each longitudinal side adjacent to the rear wheel creating a three point suspension on each side such that in the event of a crash where the motorcycle is impacted and rests on its side, said motorcycle will suspend on the three shock mounts and said motorcycle will skid forward toward its direction of travel and rotate allowing impact absorption on the motorcycles rear.

4. The motorcycle as recited in claim 2 wherein each side beam further comprising at least one headlight and a turn signal indicator also said motorcycle having a pair of taillights and a plurality of bumpers on a rear portion of enclosure with said bumpers in structural communication with the structural frame.

5. The motorcycle as recited in claim 1 wherein said engine is a gasoline fueled, water cooled, inclined, four stroke cycle type, having an electric starter, a mechanical drive assembly from engine to rear wheel and an automatic transmission with a reverse gear, wherein said outrigger landing wheels extend downward when said automatic transmission is in reverse gear, wherein said bench seat is in a fixed location and is defined as having a separate backrest and a separate seat, including safety belt means to detain the driver, wherein said enclosure is essentially formed of fiberglass lined with acoustic insulation covered with fabric, wherein said motorcycle further comprising a fuel tank for supplying fuel to the engine said fuel tank mounted within the frame adjacent to said seat affording protection of the structural frame in the event of a crash, wherein said motorcycle further comprising at least one convex shaped rear view mirror inside said enclosure, and wherein said motorcycle further comprising an audio system including a pair of speakers disposed hingeably on each side of said seat in close proximity to the drivers head such that sound may be heard above road noise and adjustment made by the driver to location the speakers in an optimum position.

6. The motorcycle as recited in claim 1 wherein said handlebar assembly further comprises tilting means and pivoting means allowing the handlebar assembly to be positioned convenient to the driver, also a right handlebar grip performing as an accelerator and a brake and a left handlebar grip achieving transmission shifting, further said handlebar assembly having universal joints for changing linear alignment of the assembly.

7. The motorcycle as recited in claim 6 wherein said tilting means further comprises, a tilt releasing lever that permits the handle bar assembly to be tilted up or down and be locked in a fixed position.

8. The motorcycle as recited in claim 7 wherein said tilting means further comprises a steering shaft tilt joint mounted between a steering shaft and a handlebar shaft which is attached to a steering handlebar with both the steering shaft and the handlebar shaft communicating with the steering shaft tilt joint which consists of a fixed housing, a pivoting housing, a pair of bearings, a pair of identical spherical forks, a female spline, a male spline on the steering shaft, cap screw, and a spherical ball, said fixed housing disposed over the steering shaft and the pivoting housing disposed over the handlebar shaft each employing the pair of bearings to ensure the ends of the shafts transmit force as well as moment to their supporting housings, an end of each shaft engaging the pair of identical spherical forks with each including the female spline interfacing with the male spline on the steering shaft and the handlebar shaft with the housings seating at an outside diameter of the bearings and the forks engage with the shafts which seat in an inside diameter of the bearings and are each secured by the conventional cap screw, and the spherical ball having opposed grooves at 90 degrees apart, receive radial legs of the forks allowing the steering shaft tilt joint to pivot easily.

9. The motorcycle as recited in claim 6 wherein said pivoting means further comprises a steering bar clamping handle which permits the handle bar assembly to be oriented at a angular displacement convenient to the driver.

10. The motorcycle as recited in claim 9 wherein said pivoting means further comprises a handlebar, a handlebar shaft, a cam handle and a collar attached to the handlebar shaft allowing adjustment of the position of the handlebar by pulling the cam handle upwardly loosening the collar permitting the handlebar to rotate and reorient at any desired position.

11. The motorcycle as recited in claim 1 wherein said foot brake pedal assembly further comprises an adjustment brake pedal release handle permitting the foot brake pedal assembly to be changed to an angular displacement relative to the bench seat for driver accessibility.

12. The motorcycle as recited in claim 11 wherein said foot brake pedal assembly is pivotally affixed to the frame and linked to a conventional hydraulic front and rear wheel brake for stopping the movement of the motorcycle, an adjustment brake pedal release handle permits the foot brake pedal assembly to be adjusted to an angular displacement convenient to a driver, said foot brake pedal assembly comprises a brake pedal arm, a brake pedal pad, a step shaft, a plurality of triangular teeth, a brake actuating arm, a push rod, a master brake cylinder, a side arm on said actuating arm, a first tension spring, a brake compression spring, a brake pedal link, a pivot arm, a secondary arm, a rod connecting yoke, a tension rod and a second tensioning spring the brake pedal arm includes a brake pedal pad pivotally attached on one end, with the brake pedal arm top pivots on the step shaft which slides on the motorcycle frame, the brake pedal arm contains an annular section of the radially oriented triangular teeth which engage with similar teeth on a brake actuating arm, to ensure positive braking without slippage, on each tooth one face is located in an axial direction and the other is slanted, during a braking action, only the face in the axial direction engages to transmit torque, the brake actuating arm also pivots on the step shaft and is bifurcated to attach to the push rod which interfaces with the conventional master brake cylinder, the brake pedal arm includes the side arm connected to the first tension spring which urges the pedal arm to swing toward the rear of the motorcycle, the brake compression spring resides in a radial recess adjacent to the triangular teeth in both the pedal arm and the brake actuating arm and is disposed around the step shaft, engaging sides of the triangular teeth which are in mirror image and a shoulder on the step shaft rests on the pedal arm with the opposite end of the step shaft connected to the brake pedal link which has its opposite end connected to the pivot arm, the brake pedal link, arm and shaft are in alignment when the teeth are engaged, the pivot arm includes an integral secondary arm that connects to the rod connecting yoke which in turn connects to the pedal releasing handle located inside the enclosure with the tension rod, the pivot arm also connects to the second tension spring which forces the pivot arm and brake pedal link to align with the step shaft with the rod connecting yoke resting on the brake pedal link functioning as a stop when the pedal release handle is rotated toward the rear of the motorcycle the brake pedal link and pivot arm collapse to move the shoulder of the step shaft axially away from the pedal arm which in turn is forced to disengage from the actuating arm as urged by the brake compression spring and rotates rearwardly as forced by the first tension spring, further to adjust the brake pedal to fit a driver, the release handle is pulled allowing the pedal arm to swing to the rear and stop at a desired position, when released, the brake pedal release handle automatically locks the brake pedal arm in place.

13. The motorcycle as recited in claim 1 wherein said outrigger landing wheels further comprising a pair of wheels removably attached to a structurally rigid landing arm which include a pair of upwardly extending hinge arms that pivot onto the frame and are connected to an actuating arm with a landing wheel link, a middle hole on each actuating arm hinges on the frame with one end bifurcated and attached to each end of a pair of pivoting nuts which in turn engage a threaded output shaft of a pair of worm gears with an opposite end of each worm gear hinging on the frame, an electric motor drives both worm gears rotating the actuating arms when both actuating arms are rotated the landing wheel links force the landing arm and wheels to pivot.

14. The motorcycle as recited in claim 13 wherein said outrigger landing wheels further comprising height adjustment means from the surface upon which the motorcycle rests based on the drivers physical weight, said height adjustment means are defined as having a height adjusting mechanism located on the motorcycle control panel which consists of a driver weight calibrated nameplate and a pointing knob, a height adjustment control cable is attached to the height adjusting mechanism which moves a stop switch mounted on a slide bracket secured to one of the worm gear frames, the worm gear motor rotates the pivoting nut which moves along the worm gears threaded drive shaft until a pivoting pin of the pivoting nut engages the stop switch terminating the rotation of the worm gear, and when a motorcycle ignition key is removed the landing wheels automatically swing fully to the weight unloaded position for parking.

15. The motorcycle as recited in claim 1 wherein said enclosure rear housing entrance doors further include a top, a bottom, a front and a rear, with the door having a plurality of hinges on the rear vertical edge, and the bottom of each door extending below the bench seat, also the top of the door extending to the housing top allowing easy access into the enclosure for the driver.

16. The motorcycle as recited in claim 1 wherein said enclosure front housing leg doors further include a top, a bottom, a front and a rear, with the door having a plurality of hinges on the top horizontal edge, and the top of each door tapering toward the motorcycle front such that the doors open in a forward tapered angular relationship toward the motorcycle's front, allowing easy access into the enclosure for the driver, appropriate interface engagement with the entrance door and a streamline housing reducing wind drag.

17. The motorcycle as recited in claim 1 wherein said enclosure rear housing is defined as having a windshield in front of said driver and a pair of side windows within the entrance doors, positioned one on each side of said driver.

18. The motorcycle as recited in claim 1 wherein said enclosure further having a recess behind and formed by a lower portion of each entrance door curving inward and a rearward slanting indented portion of said frame, the recess providing two air inlet openings and a location for other engine accessories also space to rest a passengers feet.

19. The motorcycle as recited in claim 1 wherein said pair of enclosure entrance doors having interlinked simultaneous entrance door opening and closing means.

20. The motorcycle as recited in claim 1 wherein said pair of enclosure leg doors having interlinked simultaneous leg door opening and closing means.

21. The motorcycle as recited in claim 1 further comprising a keyed door lock disposed within the frame to lock and unlock said entrance doors.

22. The motorcycle as recited in claim 1 wherein said enclosure leg doors further comprises an electric power door release, actuated by an electrical switch, for opening and closing said leg doors also a spring force door release actuated by a lever within said enclosure for opening both leg doors during an emergency.

23. The motorcycle as recited in claim 22 wherein said electric power door release and spring force door release further comprise, a pair of door arms, an actuating collar, a pair of door links, an elongated nut, a key, a cover plate, a motorized worm gear, a front door compression spring, a pair of door latches, a control lever, a fourth tension spring and a cable connector, each leg door hinges on its upper edge to the frame and the integral door arm extends from an upper end of each door and connects to one side of the actuating collar with the door link, the actuating collar core contains an elongated round hole which engages with the elongated nut, this nut has a longitudinal keyway that engages with a conventional key mounted on the actuating collar and is covered by the cover plate such that the actuating collar can slide downward on the nut, a threaded hole in the nut engages with the threaded output shaft of the motorized worn gear mounted on the frame, the front door compression spring rests against the collar top flange and contains sufficient compressive force to open both leg doors simultaneously, the pair of door latches are attached to and hinge from the actuating collar and catch into two tapered grooves in the elongated nut such that when the actuating latch is caught, the collar stays with the nut, the door latch is actuated remotely by the control lever mounted on the enclosure instrument control panel within easy reach of a driver, a conventional electrical control switch, also located on the instrument control panel energizes the worm gear which moves the nut and actuating collar vertically to either close or open the leg doors, during an emergency the control lever will release the door latch from the elongated nut and the front door compression spring will force the actuating collar to slide downward away from the elongated nut and spring the leg doors open, the fourth tension spring pulls the door latches to close and two cable connectors complete the assembly of the door latch.

24. The motorcycle as recited in claim 1 wherein said entrance doors further comprising entrance door latching means connecting both entrance doors together with a latch link such that unlatching either door with said latching means unlatches both doors simultaneously.

25. The motorcycle as recited in claim 24 wherein said entrance door latching means further comprising of a lock plate, a spring loaded locking arm, a locking pin, a third tension spring, a latch pivoting arm, a latch arm, a connecting rod, a latch handle on each side of the motorcycle and a diagonal connecting rod, the door latches, one on each side, mount on the frame and engage a front edge of each door with each latch each having a lock plate pivoting on the frame with the plate having an integral notch engaging the spring loaded locking arm and a slot engaging the locking pin mounted on the door, each locking arm is also hinged on the frame and has the lateral pin engaging the third tension spring and the latch pivoting arm, this third tension spring forces the locking arm to tilt toward the lock plate, the latch pivoting arm also hinges on the frame and connects to the latch arm with the connecting rod, the latch arm rests on a stop of the latch handle and both latch arms and handle hinge on a integral common fixed shaft secured to the frame, when the handle is pulled the latch arm rocks the pivoting arm which raises the locking arm to disengage from the lock plate permitting the door to be pushed to open with the locking pin sliding on the open slot on the lock plate moving it out of the way, after the door is opened the lock plate remains in the open position held by the urging of the locking arm, when the door is closed the locking pin slides into the open slot of the lock plate and forces it to tilt until the locking arm engages in the notch on the lock plate completing the locking procedure, the latch arm includes a side arm that connects to a side arm of the mating latching arm on the opposite door utilizing the diagonal connecting rod.

26. The motorcycle as recited in claim 1 wherein said entrance doors further comprising entrance door hinge means connecting both entrance doors together with a hinge link such that opening either door with said hinge means opens both doors simultaneously.

27. The motorcycle as recited in claim 26 wherein said entrance doors further comprising an emergency spring loaded entrance door connecting pin coupled to said hinge link to open both entrance doors simultaneously from within said enclosure, wherein said entrance doors open individually by pulling said pin during an emergency.

28. The motorcycle as recited in claim 26 wherein said entrance door hinge means further comprising a hinge link, a pair of entrance door latches, a pair of hinge compression springs, a fixed connecting rod, a door arm, an adjustable connecting rod, a safety pin swing arm assembly, a swing arm, and a diagonal connecting rod, the hinge link permits the doors to open and close in concert, this link consists of the fixed connecting rod, the adjustable connecting rod, the safety pin swing arm assembly, the swing arm hinged on the frame and the diagonal connecting rod, the safety pin swing arm assembly consists of a pin hole arm and a safety pin arm an end hole on the pin hole arm and a middle hole on the safety pin arm hinge on a common pin secured to the frame, an upper member of the safety pin arm includes a vertical housing containing a step pin loaded against a compression spring with the pin hole arm locked together with the safety pin arm with the step pin and a control cable with two handle rings, one located inside to be reached by a driver the other located outside for rescue, the connecting rod fastens the road side entrance door to the swing arm and the diagonal connecting rod connects the swing arm to the safety pin arm, the adjustable connecting rod attaches the pin hole arm to the curb side entrance door allowing both entrance doors to latch simultaneously and by pulling either handle ring the hinge link is disconnected allowing the entrance doors to be operated individually during an emergency.

29. The motorcycle as recited in claim 1 further comprising a two piece external passenger seat having a fold down cargo compartment therebeneath, such that when the passenger seats are hinged upwardly, the fold down cargo compartment mechanically unfolds providing storage for items or personal effects therein.

30. An enclosed motorcycle having a structural frame, a pair of tandem wheels, an engine and a handlebar assembly, providing means for transporting a single driver comprising:

a foot brake pedal pivotally affixed to the frame stopping movement of the motorcycle, a bench seat rigidly attached to the frame for seating the driver, a pair of outrigger landing wheels, attached to the frame motorcycle, on a common axle with said landing wheels having automatic control to extend the wheels, at a predetermined road speed, so as to be in close proximity to the surface upon which the motorcycle is resting for preventing tipping at low speeds and when stopped, and an enclosure disposed over and attached to the frame, said enclosure having a pair of entrance doors and a pair of leg doors one on each side of the motorcycle for access to the seat for minimizing the enclosure envelope and providing effortless entry into the motorcycle, and rear edges of said leg doors mate with the front edge of each entrance doors.

* * * * *